Figure 1:
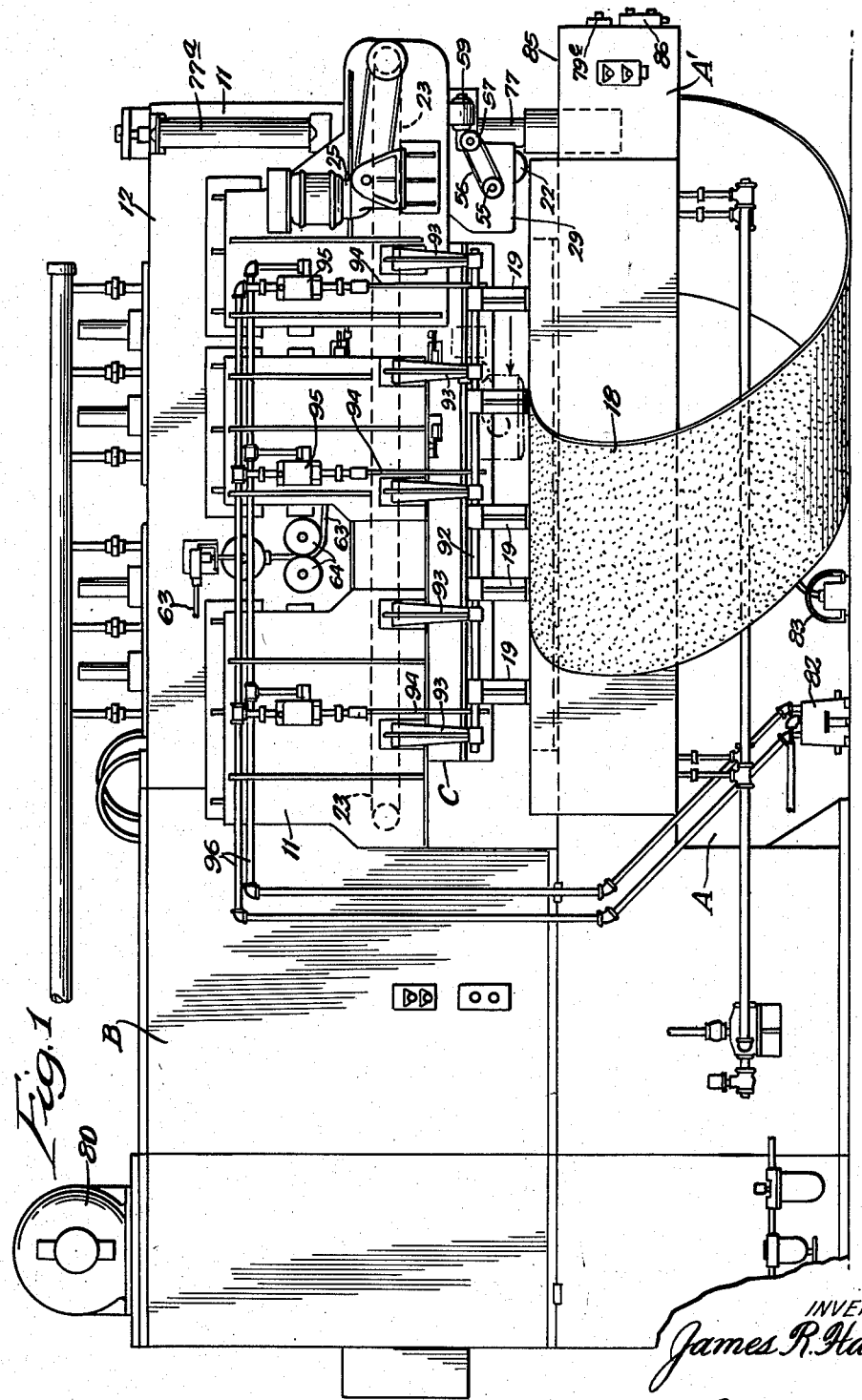

Nov. 24, 1953   J. R. HAWKINS   2,660,220
GLUE-JOINING AND PRESS APPARATUS AND METHOD
OF JOINING THE ENDS OF ABRASIVE STRIPS
Filed May 25, 1951   7 Sheets-Sheet 1

INVENTOR:
James R. Hawkins,
BY Carl C. Batz
ATTORNEY.

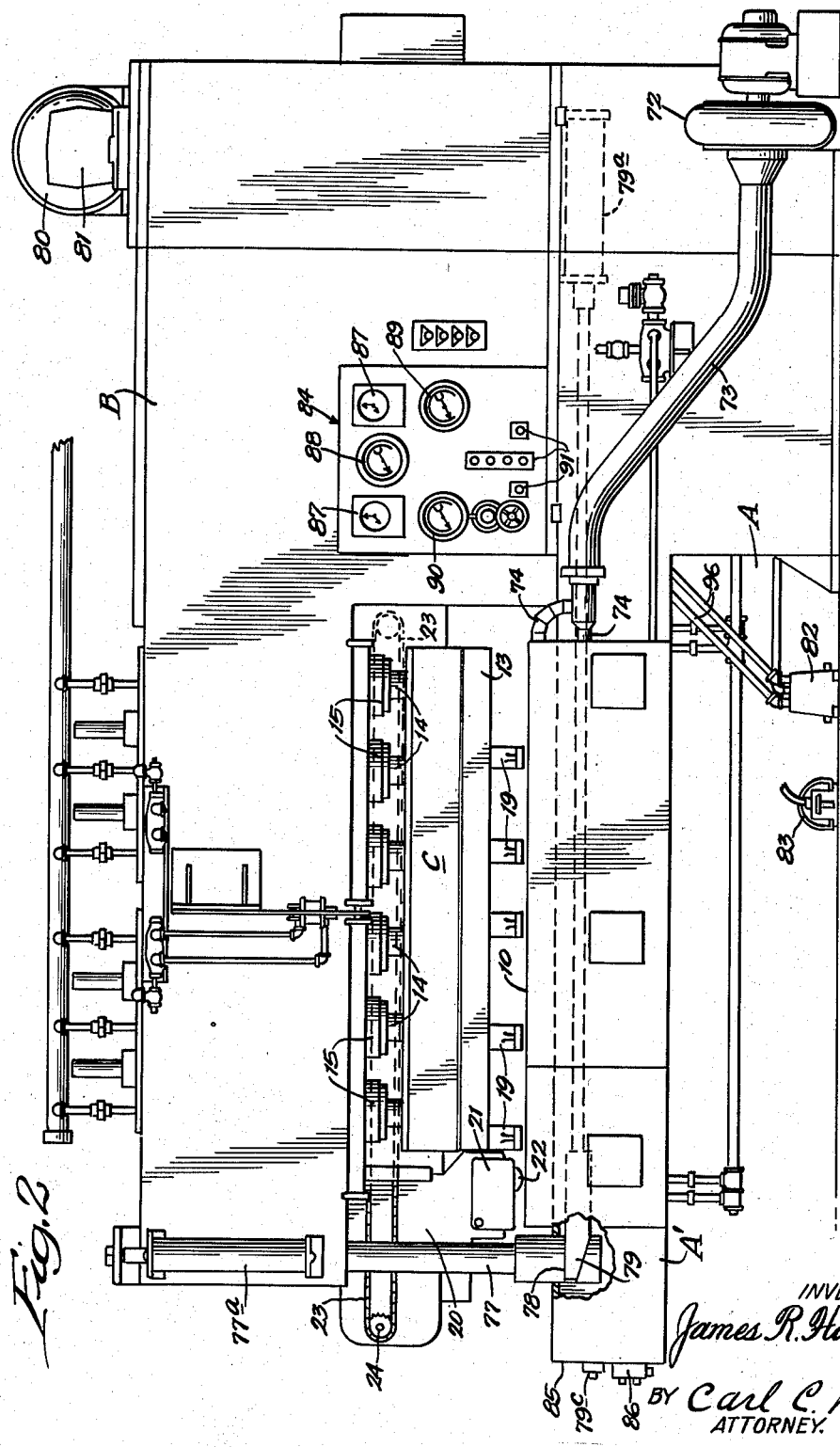

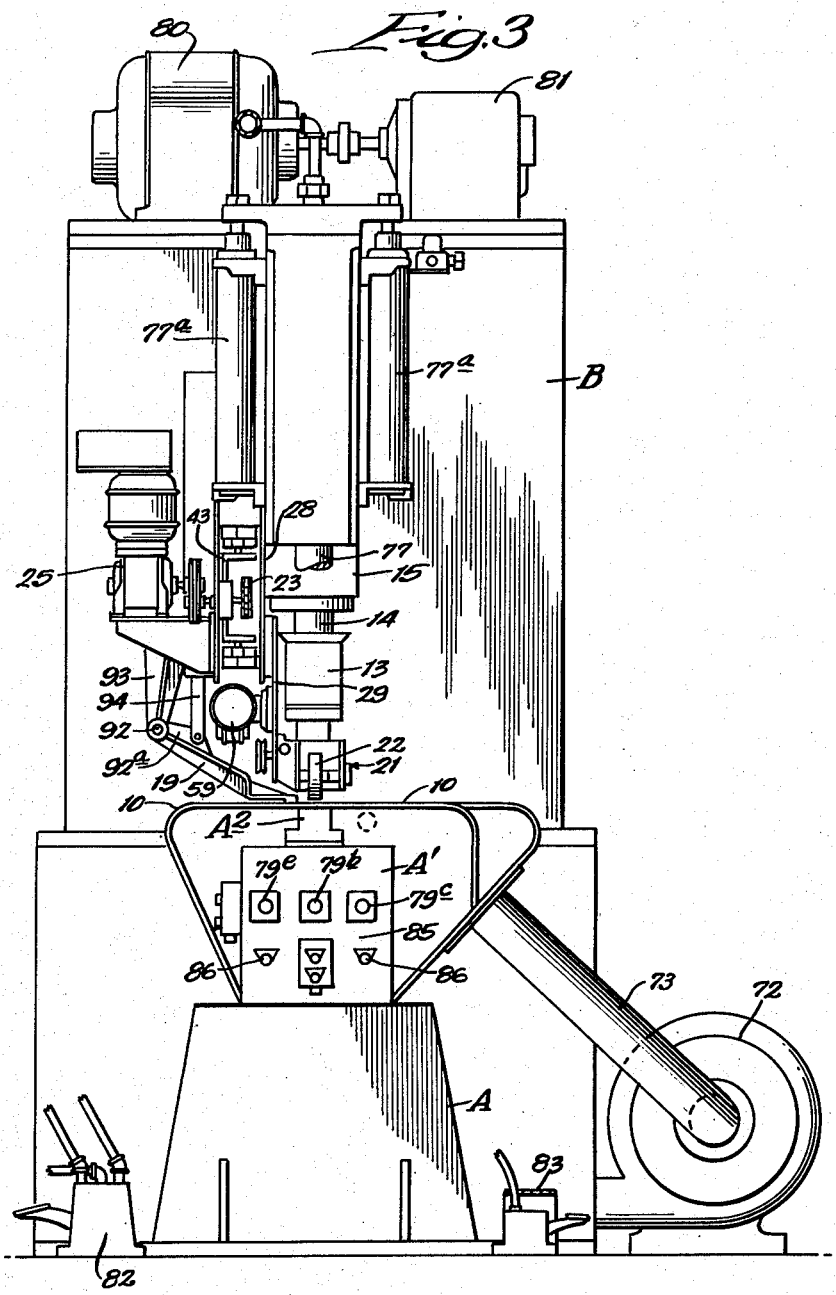

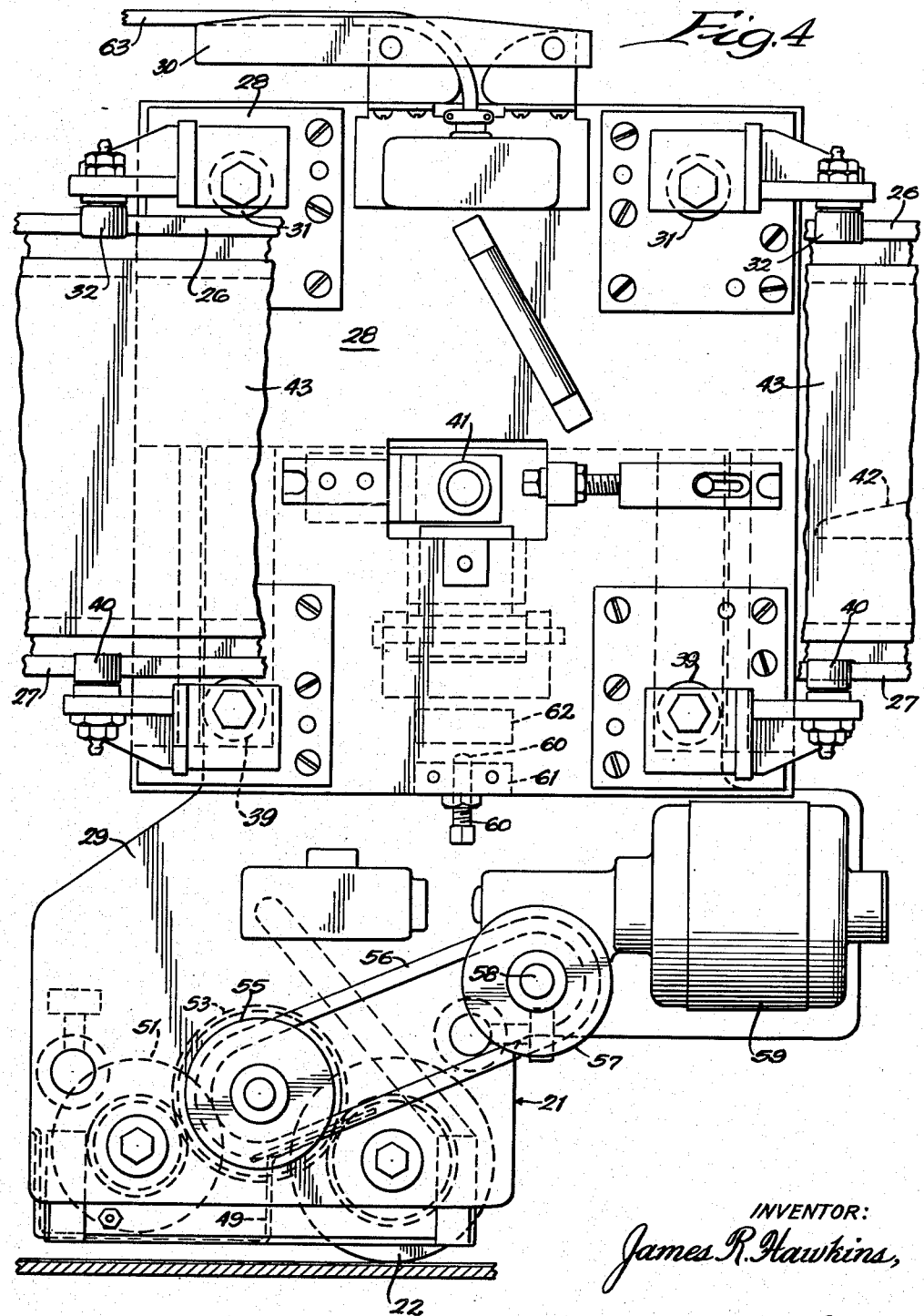

Nov. 24, 1953   J. R. HAWKINS   2,660,220
GLUE-JOINING AND PRESS APPARATUS AND METHOD
OF JOINING THE ENDS OF ABRASIVE STRIPS
Filed May 25, 1951   7 Sheets-Sheet 5
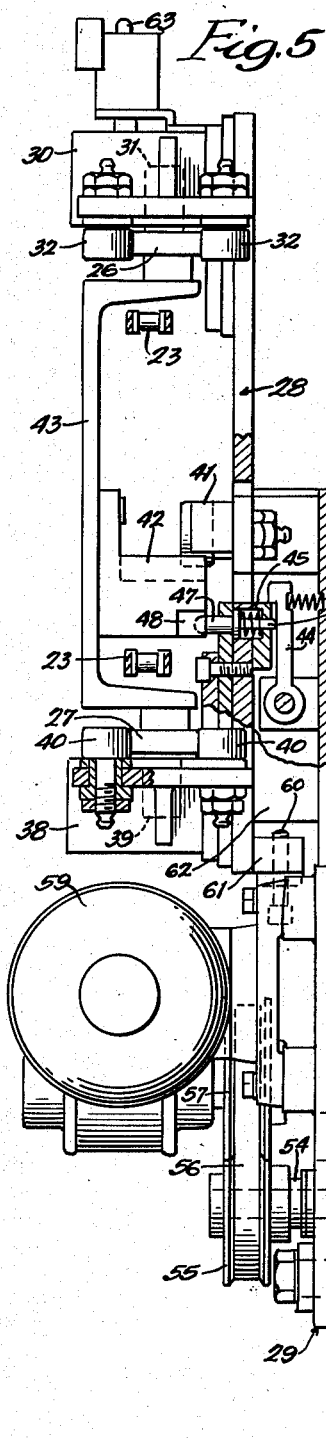
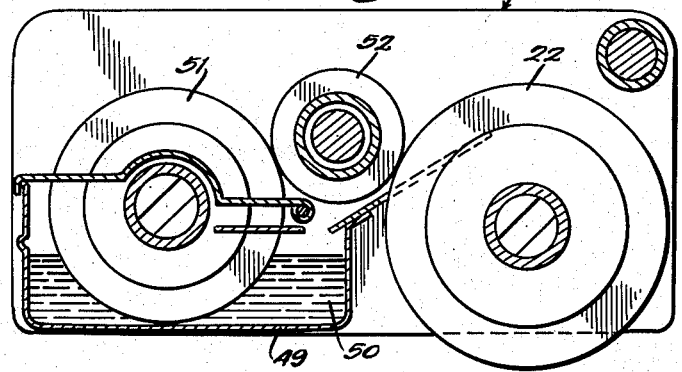
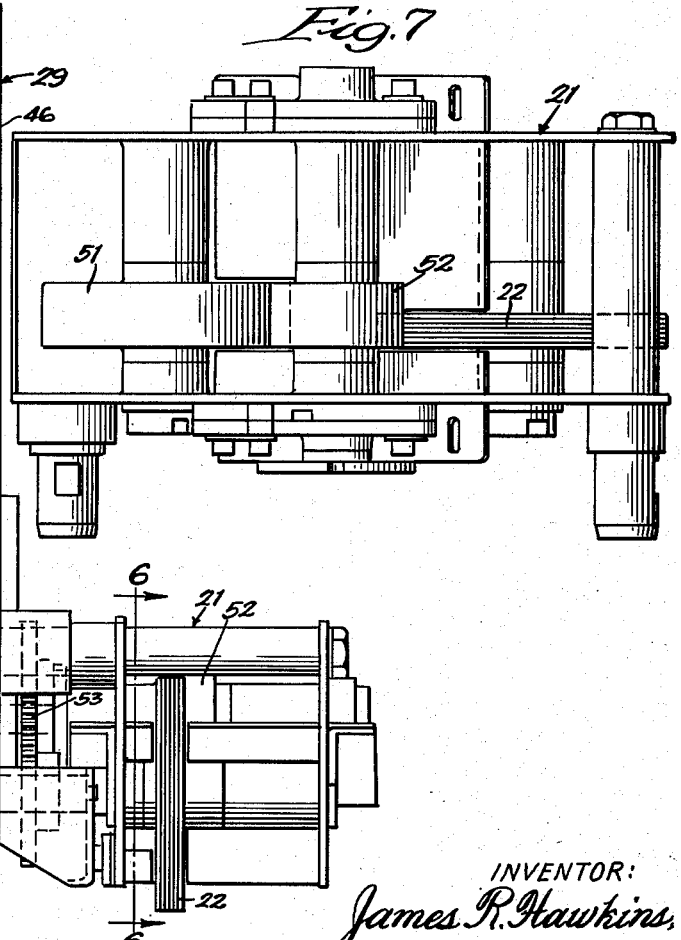
INVENTOR:
James R. Hawkins,
BY Carl C. Batz
ATTORNEY.

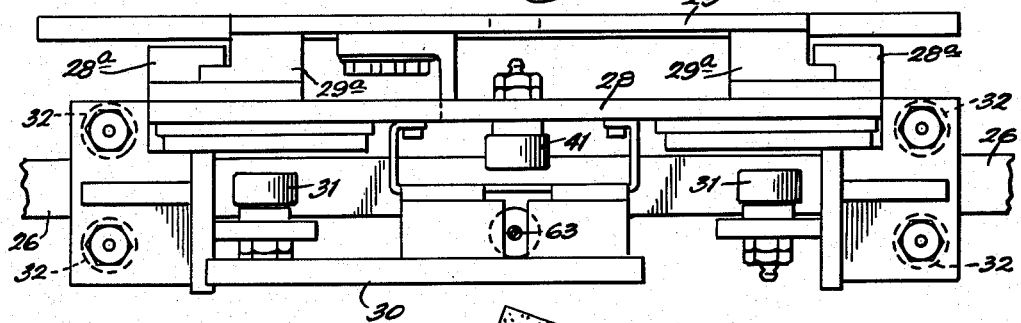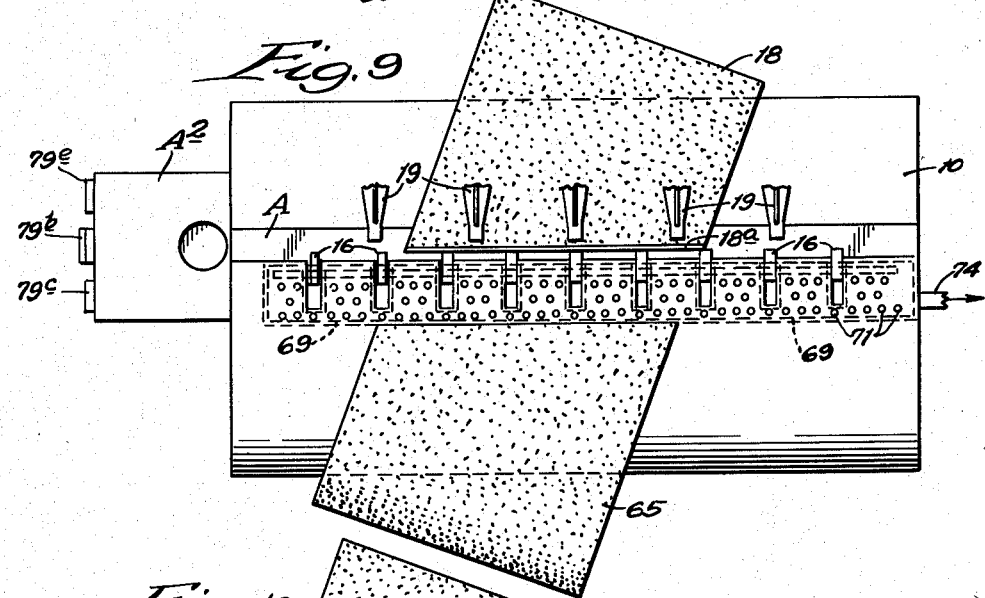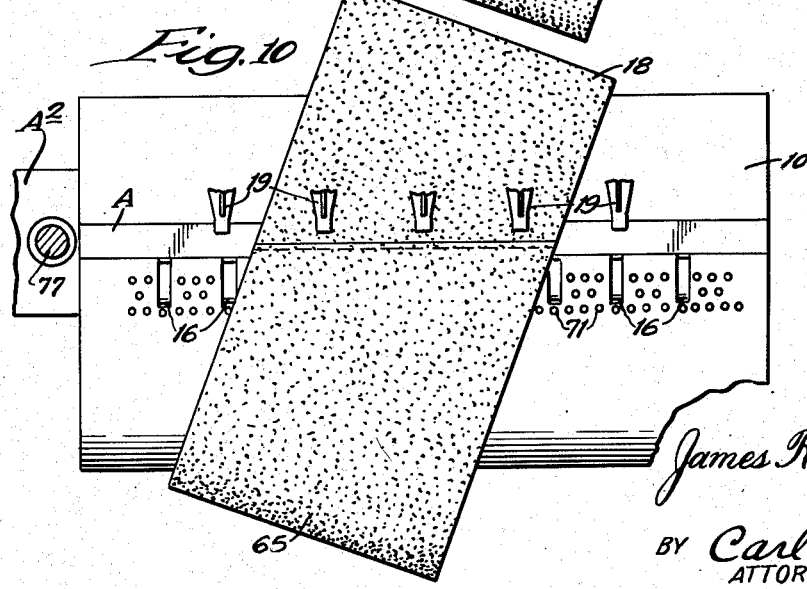

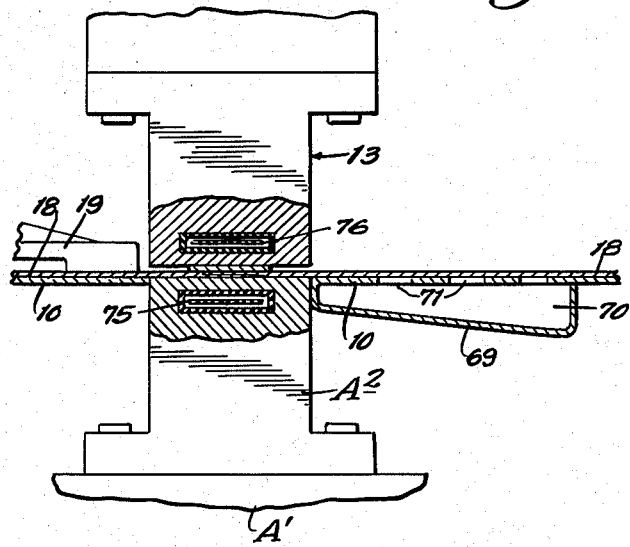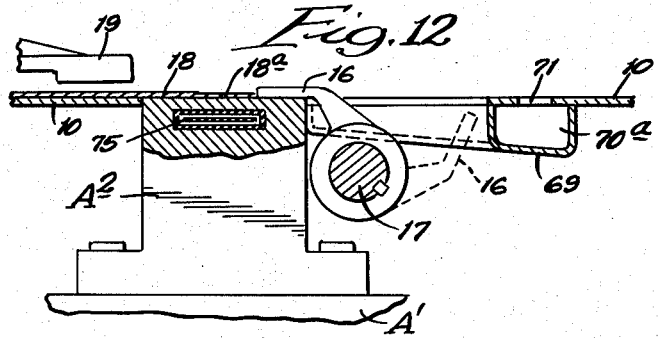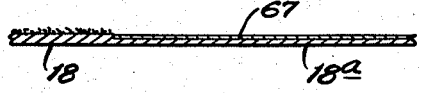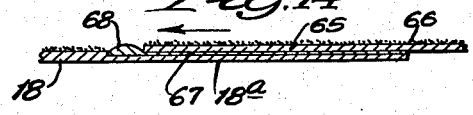

Patented Nov. 24, 1953

2,660,220

UNITED STATES PATENT OFFICE 2,660,220

GLUE-JOINING AND PRESS APPARATUS AND METHOD OF JOINING THE ENDS OF ABRASIVE STRIPS

James R. Hawkins, Deerfield, Ohio, assignor to Armour and Company, Chicago, Ill., a corporation of Illinois Application May 25, 1951, Serial No. 228,308

15 Claims. (Cl. 154—42)

This invention relates to glue-joining and press apparatus and is particularly useful in the joining of ends of a sandpaper strip for the forming of a continuous belt. In addition to the belt splicing use, the machine may be employed for other purposes.

The joining of the ends of an abrasive covered paper strip has presented a serious problem in view of the fact that the overlapping ends which are joined by glue must have a thickness which is not substantially greater than the thickness of the remainder of the abrasive-backed strip. If, at the spliced ends, the joint is larger, the abrasive belt will cause a repeated lifting of the work as the enlarged joint passes the work with a tendency of the operator to bring the work back with increased pressure against the following portion of the belt. This results in uncertain and unsatisfactory work production.

A further problem is presented in the means for holding a heavy backing strip covered with adhesive and abrasive in an accurate position while the glue is being applied and holding both ends of the strip in overlapping accurate relation while the press operates.

The application of glue to the skived edge of the abrasive strip presents a problem because of the need for supplying even amounts of glue across the strip without interfering with the press and holder devices while at the same time avoiding the application of glue to the press where such application is not needed.

An object of the invention is to provide a machine which accomplishes the above mentioned purposes while providing several additional functions. A further object is to provide a compact machine provided with means for aligning the end of a strip which is to be glued and for holding the same during the gluing operation, while at the same time providing also traveling glue means for applying to the exposed edge a uniform quantity of glue. A still further object is to provide a machine having means for accurately holding the overlapping edges of a strip in accurate relation while pressing the overlapping edges to produce a joint of substantially the same thickness as the remainder of the completed belt. A further object is to provide a carriage structure in such a machine which carries a glue-applying wheel and pot for glue across the edge of the paper and while providing supporting means which bring the wheel and pot below the press, the supporting structure, however, guiding the carriage beyond an end of the press. A still further object is to provide in such a machine retractable fingers for aligning the end portions of the strip to be glued and also suction means whereby the mating edges of the strip may be held in accurate relation while the press is operating. A still further object is to provide lift means associated with the carriage for raising the glue pot and wheel applying roller above the press toward one end of the travel of the carriage while providing means for releasably latching the pot and wheel support in raised position. A still further object is to provide an improved glue-applying and press machine of compact arrangement which effectively unites and compresses the overlapping edges of a strip for uniting the same in a thickness not greater than the thickness of the remainder of the completed belt. Other specific objects and advantages will appear as the specification proceeds.

The invention is shown in an illustrative embodiment by the accompanying drawings, in which—

Fig. 1 is a side view in elevation of apparatus embodying my invention; Fig. 2, a similar side view in elevation of the opposite side to that shown in Fig. 1; Fig. 3, an end view in elevation; Fig. 4, a broken enlarged side view of the glue pot and glue-applying wheel and the supporting plates therefor; Fig. 5, an enlarged end view of the glue pot and applying wheel and the supporting mechanism therefor; Fig. 6, an enlarged transverse sectional view, the section being taken as indicated at line 6—6 of Fig. 5; Fig. 7, a top plan view of the glue pot structure shown in Fig. 6; Fig. 8, a plan view of the supporting carriage for the glue pot structure; Fig. 9, a broken plan view of the top of the bed showing the spliced ends of the belt and the holding means employed for securing the ends, the edges of the strips being in partially overlapping relation; Fig. 10, a view similar to Fig. 9 but showing the overlapped edges after the compression step; Fig. 11, an enlarged broken and part sectional view showing the press head bearing against the head of the base and showing also the heating means therefor; Fig. 12, an enlarged sectional detail view showing the aligning retractable fingers adapted to engage the forward edge of the skived end of the strip; Fig. 13, a sectional view of the skived end of the strip after the application of glue thereto; and Fig. 14, a sectional view showing the application of the second edge of the strip to the skived edge thereof.

In the illustration given, A designates a base provided with a raised portion A¹ on which is mounted a head or anvil A², as shown more clearly in Fig. 3. About the structure A¹ and A² extends a casing providing a bed 10.

Above the base A and bed 10 is a bridge structure B consisting of side standards 11 and an overhanging bridge beam 12. Movably mounted within the bridge frame is a press C having a presser head 13 mounted on pistons 14 which extend within the cylinders 15.

The bed 10, in the illustration given, is slotted to receive retractable aligning fingers 16. As shown more clearly in Fig. 12, the fingers are mounted on a rock shaft 17, the shaft being rotated by compressed air means or other fluid pressure means. In the retracted position shown in dotted lines, the fingers extend below the top of the bed 10 and permit a second end of the strip to be placed upon the bed.

The skived end of the abrasive strip 18 is first placed upon the bed 10 and moved forwardly until it engages the edges of the aligning fingers 16, as shown more clearly in Fig. 12. I then provide clamping arms 19 which extend inwardly to one side of the press for gripping the abrasive strip 18 and anchoring it in the aligned position against the fingers 16. The strip is now in proper condition for the application of glue and it will be noted that the skived portion 18a of the strip 18 is exposed for engagement with a glue wheel or other glue-applying means.

In the illustration given, I provide a carriage 20 upon which is mounted a glue pot 21 equipped with a glue-applying roller 22. The carriage is moved across the bed and back to its initial position by means of a continuous chain 23 supported by sprockets 24, one of which is driven by a motor 25, as shown more clearly in Fig. 3.

The carriage for the glue pot structure is mounted upon the spaced tracks 26 and 27, as shown more clearly in Figs. 5 and 8. The carriage consists of an upper plate 28 which is suspended upon the track 26 and a lower plate 29 which is supported by plate 28 but is vertically movable with relation thereto. The two plates are slidably connected, plate 29 being equipped with the tongue members 29a and plate 28 being equipped with the tongue members 28a interlocking with members 29a, as indicated best in Fig. 8. Plate 28 is provided with a laterally-extending frame member 30 supporting a vertically-extending wheel 31 engaging the top of track 26 and supporting, also, the side rollers 32 which engage the sides of track 26. The plate 28 is also provided at its base with a laterally-extending bracket 38 on which is mounted a vertically-extending roller 31 engaging the bottom of track 27 and horizontally-extending rollers 40 which engage the sides of track 27, as shown more clearly in Fig. 5.

The vertically-movable plate 29 is provided with a laterally-extending lift member or roller 41 which is adapted to engage the inclined surface of a cam 42 fixed to a frame plate 43 at one end of the frame B, as shown best in Figs. 4 and 5. With this construction, the glue pot supporting plate 29 is raised as it approaches one end of its travel, thus removing the glue-applying wheel from the press as it moves beyond the end of the press member C. Suitable latching means may be provided for releasably latching the plate 29 in raised position. As shown best in Fig. 5, a spring-urged latch member 44 is movable into engagement with an abutment 45 mounted on plate 28, and the latch is made releasable by a spring-pressed plunger 46 having its inner end portion 47 engageable with a cam surface 48 with which the fixed cam member 42 is provided. In operation, when the plate 29 is raised, the latch 44 engages the abutment 45 and retains the raised plate 29 in the elevated position. When, however, the carriage is moved to bring it toward the press, the plunger head 47 engages the cam surface 48 and releases the abutment 45 from the latch 44.

The gluepot structure 21 is secured to the lower end of plate 29, as shown best in Figs. 5 and 7. Mounted within the structure 21 is a glue-containing vessel or pot 49 in which a pool of glue 50 is supported. A roller 51 is mounted for travel within the glue bath and the surface of the roller 51 engages an intermediate roller 52. The intermediate roller 52 bears against the glue-applying roller 22. The rollers are mounted upon shafts which are driven through a series of gears 53 mounted on shaft 54. The shaft 54 is equipped with a pulley 55 and a belt 56 connects pulley 55 to a pulley 57. The pulley 57 is mounted upon a shaft 58 which, through reduction gearing, is driven by the motor 59, all as shown best in Fig. 4.

An adjustment stop screw 60 is mounted within a threaded plate 61 and extends thereabove, the plate 61 being carried by the lower plate 29. Plate 28 carries an abutment 62 engageable with the stop screw 60.

Since the traveling carriage carries its own motor, it is preferred to provide an electric cable 63 downwardly by the rollers 64, as shown more clearly in Fig. 1.

After the glue has been applied to the skived edge of the strip, the opposite end of the strip is placed upon the bed 10 and brought into partial overlapping relation therewith, as shown more clearly in Fig. 14. The latter end 65 is provided with abrasive 66. As the strip 65 is pressed forwardly over the glue layer 67, a small amount of glue is accumulated against the forward edge of strip 65, the amount being shown in exaggerated form in Fig. 14, and when the edge fo the strip 65 engages the shoulder 68 on strip 18, a strong end union of the parts is brought about.

It is important that the strip 65, after being brought into overlapping relation with the skived portion 18a of strip portion 18, be held firmly in the overlapped condition. The stop fingers 16 in the meantime have been brought to retracted position, as shown in dotted lines in Fig. 12. To hold the strip portion 65 firmly upon bed 10, the bed 10 is provided with a hollow apron or casing 69 which provides a vacuum or suction chamber 70. The bed 10 is provided with apertures 71 communicating with chamber 70. At the areas where the stop fingers 16 operate, the casing 69 is reduced in size to form the reduced chamber portion 70a. A motor-driven vacuum pump 72 is connected by the pipes 73 and 74 to the vacuum chamber 70.

The base support or anvil A² is preferably provided with an electric resistance element 75 for heating the same. Similarly, the reduced portion of the press head 13 is provided with a heater 76 for heating the head 13.

It is desired to secure the bridge frame carrying the supporting structure for the press to the base A at the time the press head 13 engages the base head or anvil A². As shown more clearly in Fig. 2, there is provided a locking bolt 77 provided laterally with a cam slot 78 engageable with the horizontally-extending cam member 79. The cam member 79 is actuated by a piston rod connected to a piston within air cylinder 79a and the flow of compressed air to the cylinder is controlled by switch 79b. Switches 79c close the locking bolt 77. Cam member 79 is adapted to be urged forward into engagement with the cam slot 78 of member 77 to anchor the members together.

Any suitable fluid pressure may be provided for operating the cylinders shown. In the specific structure shown, compressed air is supplied from a housing system and through a main line to the machine. The motor 80 is mounted on the top of the structure B for driving the hydraulic pump 81 for operating the pistons 14. Treadle-controlled valve means 82 and 83 are provided for supplying the compressed air to the various cylinders at the desired times. Since such valve structures are old in the art, a detailed description herein is believed unnecessary. It will further be understood that equivalent means for operating the various parts as, in some instances, solenoid and other electrical apparatus, may be substituted for the fluid pressure means shown.

Electrical controls may be mounted upon the box 84 and at the ends of the machine 85. In the specific illustration given, it is necessary for the two operators of the machine to press three switches 86 at each end of the machine in order to operate the press. On control box 84 are mounted timers 87, an oil temperature gauge 88, a low pressure regulator 89, a high pressure regulator 90, and various control switches 91 for closing the press. It is understood that all of such control devices are old and well known in the art, and a detailed description is herein unnecessary. It is, however, believed new to require that three switches be operated simultaneously at opposite ends of the machine in order to operate the press.

The clamping arms 19 which engage the skived end portion 18a of the end portion 18 are secured upon a rock shaft 92 supported upon the casing B by straps 93. The shaft is rocked by laterally-extending arms 92a which are secured to the plunger 94 connected to pistons within the air cylinders 95. The cylinders are connected by conduits 96 and through the treadle valve 82 to the source of air pressure.

When relatively wide strips are employed in making the belt, the strips may cover the entire bed provided with the vacuum ports 71. However, when strips of relatively narrow widths are being processed, the operators, as a practical measure, use adhesive tape or other means to cover up the ports 71 which are not employed for holding the strip portion 65 on the bed 10.

Operation

In the operation of the apparatus, the operator on one side of the machine draws the skived end 18 of the strip over the bed 10 of the press until the forward edge engages the alignment fingers 16 which have been raised to the position shown in Fig. 12. Thus, the forward edge of the strip portion 18 is accurately aligned. The operator then presses the treadle-controlled valve 82 to pass compressed air to the cylinders 95. The piston shafts 94 move downwardly against the lateral extensions 92a of rock shaft 92 and cause the arms 19 to be pressed downwardly against the strip end portion 18, leaving the skived portion 18a exposed for engagement by the glue roller.

The glue-supporting plate 29 is then released from latch 44 as the carriage 20 is drawn forward by chain 23 as the plunger head engages the cam head 48 of the cam member 42. Plate 29 then moves downwardly to bring the glue wheel 22 against the paper strip portion 18 and the roller applies glue to the skived portion 18a thereof as the carriage moves across the bed 10. Usually the roller is returned over the same course and as the carriage passes the end of the press, the abutment 41 of plate 29 engages the fixed cam 42 and plate 29 is again raised with the gluepot 21 supported thereon and the latch 44 connects plate 29 in its raised position to the plate 28.

After the application of glue, the operator on the other side of the press moves the opposite abrasive-carrying end portion 65 to the position shown in Fig. 14 and then presses the portion 65 forwardly to bring the end thereof against the shoulder 68 of the strip portion 18. In the meantime, the alignment fingers 16 are retracted to the position shown in dotted lines in Fig. 12. Suction is applied within chamber 70 and the strip portion 65 is thus firmly held in the desired position. The operators then operate three switches at the different ends of the machine to actuate the press. The press is preferably operated in two stages. There is first a low pressure operation at 15 tons followed by a high pressure operation at 120 tons. In this operation, the density of the paper at the point of junction is clearly increased so as to form a joint which is of the same thickness as that of the remainder of the completed belt. The heated press members 13 and A² aid in the penetration of the glue and the drying thereof. Upon the raising of the press, the completed belt may be slipped off the end of the machine where the locking bolt 77 is employed when the same has been raised by admitting pressure to the lower end of the air cylinder 77a. In this operation, the latching bolt 79 is retracted to free bolt 77.

While in the foregoing specification, I have set out a specific structure in considerable detail for the purpose of illustrating one embodiment of the invention, it will be understood that the details and structure thereof may be varied widely by those skilled in the art without departing from the spirit of my invention.

I claim:

1. In glue-joining and press apparatus, a bed, a frame providing a bridge there-above, a press mounted in said bridge for movement toward said bed, fingers associated with said bed and adapted to align the forward edge portions of a strip advanced over said bed, said fingers being retractable below said bed, holder means carried by the bridge frame and engageable with the strip to hold the same with the forward edge thereof aligned and exposed, a carriage extending laterally of the press and movable longitudinally thereof and beyond the press, a gluepot extending laterally of the carriage member below the press, and glue-applying means carried by said gluepot and engageable with the exposed edge of said strip for applying glue, said carriage comprising a roller-equipped plate engageable with a track structure on said bridge frame, and a gluepot-supporting plate vertically movable with respect to said first-mentioned plate and engageable with means on said frame for raising said gluepot at one end of the travel of said carriage.

2. In a glue-joining and press apparatus, a bed, a frame providing a bridge there-above, a press mounted in said bridge for movement toward said bed, fingers associated with said bed and adapted to align the forward edge portions of a strip advanced over said bed, said fingers being retractable below said bed, holder means carried by the bridge frame and engageable with the strip to hold the same with the forward edge thereof aligned and exposed, a carriage extending laterally of the press and movable longitudinally thereof and beyond the press, a gluepot extending laterally of the carriage member below the press, and glue-wheel means carried by said gluepot and engageable with the exposed edge of said strip for applying glue, said carriage comprising a roller-equipped plate engageable with a track structure on said bridge frame, and a gluepot-supporting plate vertically movable with respect to said first-mentioned plate and engageable with means on said frame for raising said gluepot at one end of the travel of said carriage.

3. In apparatus of the character described, a base, a bridge over said base, a press mounted for vertical movement in said bridge and movable toward said base, said base being adapted to receive the end of a strip to which glue is to be applied, a carriage member mounted on said bridge and movable thereon laterally of said press, means for moving said carriage back and forth along said bridge, and a vertically-movable plate carried by said carriage and extending below said press, a gluepot secured to the lower end of said plate and extendable below said press, glue-applying means carried by said pot for applying glue to the exposed edge of said strip, and means on said frame and movable plate for raising said gluepot above said bed when said pot is moved beyond the end of said press.

4. In apparatus of the character described, a base, a bridge over said base, a press mounted for vertical movement in said bridge and movable toward said base, said base being adapted to receive the end of a strip to which glue is to be applied, a carriage member mounted on said bridge and movable thereon laterally of said press, means for moving said carriage back and forth along said bridge, and a vertically-movable plate carried by said carriage and extending below said press, a gluepot secured to the lower end of said plate and extendable below said press, glue-applying means carried by said pot for applying glue to the exposed edge of said strip, means on said frame and movable plate for raising said gluepot above said base when said pot is moved beyond the end of said press, and releasable latch means for holding the vertically-movable carriage plate in raised position when said carriage is at one end of its travel.

5. In apparatus of the character described, a base, a bridge over said base, a press mounted for vertical movement in said bridge and movable toward said base, said base being adapted to receive the end of a strip to which glue is to be applied, a carriage member mounted on said bridge and movable thereon laterally of said press, means for moving said carriage back and forth along said bridge, and a vertically-movable plate carried by said carriage and extending below said press, a gluepot secured to the lower end of said plate and extendable below said press, glue-wheel means carried by said pot for applying glue to the exposed edge of said strip, means on said frame and movable plate for raising said gluepot above said base when said pot is moved beyond the end of said press, and motor-driven means carried by said carriage for rotating the glue-applying roller.

6. In apparatus of the character set forth, a base adapted to receive the edge of a strip to which glue is to be applied, a bridge over said base, a press mounted in said bridge for movement toward said base, retractable fingers carried by said base against which the edge portions of said strip may be pressed, clamping means supported upon said bridge frame for engaging said strip, said clamping means extending laterally of said press and against said strip, said clamping means leaving the inner edge of the strip exposed, a carriage member supported laterally of the press, a gluepot secured to the carriage member and extending inwardly below said press and above said exposed portion of said strip, means for moving said carriage back and forth across said base, a glue wheel mounted in said gluepot for receiving glue from said pot, a motor mounted upon said carriage and means driven by said motor for rotating said glue wheel.

7. In apparatus of the character set forth, a base adapted to receive the edge of a strip to which glue is to be applied, a bridge over said base, a press mounted in said bridge for movement toward said base, retractable fingers carried by said base against which the edge portions of said strip may be pressed, clamping means supported upon said bridge frame for engaging said strip, said clamping means extending laterally of said press and against said strip, said clamping means leaving the inner edge of the strip exposed, a carriage member supported laterally of the press, a gluepot secured to the carriage member and extending inwardly below said press and above said exposed portion of said strip, means for moving said carriage back and forth across said base, a glue wheel mounted in said gluepot for receiving glue from said pot, a motor mounted upon said carriage, means driven by said motor for rotating said glue wheel, and means for lifting said gluepot above said base after the same has passed beyond the end of said press.

8. In a structure of the character set forth, a flat-surfaced base, a bridge upon said base, a press mounted in said bridge for movement toward the flat surface of said base, retractable fingers in the flat surface of said base adapted when in raised position to engage the forward edge of a strip placed upon said surface to align the edge portions thereof, said fingers when in retracted position lying below the flat surface of said base, and suction means located in the flat surface of said base beyond said fingers for holding another strip portion which is fed forwardly, after the retraction of said fingers, into overlapping relation with said first-mentioned edge portion below said press.

9. In a structure of the character set forth, a flat-surfaced base, a bridge upon said base, a press mounted in said bridge for movement toward the flat surface of said base, retractable fingers in said surface adapted when in raised position to engage the forward edge of a strip placed upon said surface to align the edge portions thereof, said fingers when in retracted position lying below the flat surface of said base, and suction means located in the flat surface of said base beyond said fingers for holding another strip portion which is fed forwardly, after the retraction of said fingers, into overlapping relation with said first-mentioned edge portion below said press, said suction means comprising a casing providing a suction chamber below the flat surface of said base, and means for producing a vacuum within said chamber, said flat surface of the base being perforated above said suction chamber.

10. In belt-splicing apparatus, a base providing a flat surface arranged to receive thereon an abrasive strip portion having its forward edge skived to remove the abrasive, a press supported above said base for movement against said base, means for raising and lowering said press, a hollow apron supported at one side of said base and providing a vacuum chamber beneath a flat upper surface aligned with said flat base surface, the flat surface of said apron being provided with small openings, means for placing said chamber under vacuum, said apron being adapted to receive the other end portion of said belt strip and to hold the same thereon by the suction of said suction chamber and with the forward edge of the strip in overlapping relation with the skived other end of the belt, means for applying glue to the surface of one of said overlapping portions while the press is raised, and means for moving said press downwardly toward said base to unite the overlapping end portions of said abrasive strip.

11. The method of joining the ends of a strip coated with abrasive on one side thereof, comprising skiving the abrasive material from one end portion of said strip to provide a relatively abrasive-free transversely-extending border area, moving the skived end of said strip across a surface with the abrasive-coated side away from said surface until said border area abuts retractable stop members, clamping the skived end of said strip to said surface with the abrasive-free border area exposed, applying adhesive to said border area, also retracting said stop members, then moving the other end of said strip across said surface with the abrasive-coated side away from said surface into edge overlapping relation with said border area and with said other end outermost, clamping said other end to said surface with the overlapping end portions of said strip exposed, and then pressing the overlapping end portions of said strip against said surface to produce a permanent joint therebetween.

12. The method of claim 11 in which the skived end of said strip is clamped to said surface by means of a solid member pressing against the abrasive coated side of said end portion, and the other end of said strip is clamped to said surface in edge overlapping relation with the skived end portion of said strip by applying suction to said other end to secure it to said surface.

13. The method of joining the ends of a strip coated with abrasive on one side thereof to form an abrasive belt, comprising skiving the abrasive material from one end portion of said strip to provide a relatively abrasive-free transversely-extending border area, moving the skived end of said strip across a flat horizontal surface with the abrasive coated side thereof uppermost until said border area abuts retractable stop members, clamping the skived end of said strip to said surface with said abrasive-free border area exposed, applying adhesive to said border area, also retracting said stop members below said surface, then moving the other end of said strip across said surface with the abrasive coated side uppermost into edge overlapping relation with said border area and with said other end portion uppermost, applying suction to the underside of said other end to secure it to said surface, applying heat to the overlapping end portions of said strip while pressing them against said surface with sufficient force to flatten the joint thus formed by reducing the thickness of the overlapping portions of said strips.

14. The method of joining the ends of a strip coated with abrasive on one side thereof, comprising skiving the abrasive material from one end portion of said strip to provide a relatively abrasive-free transversely-extending border area, moving the skived end of said strip across a surface with the abrasive-coated side away from said surface until said border area abuts retractable stop members, releasably securing the skived end of said strip to said surface with the abrasive-free border area exposed, applying adhesive to said border area, also retracting said stop members, then moving the other end of said strip across said surface with the abrasive-coated side away from said surface into edge overlapping relation with said border area and with said other end outermost, releasably securing said other end to said surface with the overlapping end portions of said strip exposed, and then pressing the overlapping end portions of said strip against said surface to produce a permanent joint therebetween.

15. In glue-joining and press apparatus, a bed, a frame providing a bridge there-above, a press mounted in said bridge for movement toward said bed, retractable stop means associated with said bed and adapted to align the forward edge portions of a strip advanced over said bed, holder means carried by the bridge frame and engageable with the strip to hold the same with the forward edge thereof aligned and exposed, a carriage extending laterally of the press and movable longitudinally thereof and beyond the press, a gluepot extending laterally of the carriage member below the press, and glue-applying means carried by said gluepot and engageable with the exposed edge of said strip for applying glue, said carriage comprising a roller-equipped plate engageable with a track structure on said frame, and a gluepot-supporting plate vertically movable with respect to said first-mentioned plate and engageable with means on said frame for raising said gluepot at one end of the travel of said carriage.

JAMES R. HAWKINS.

References Cited in the file of this patent

UNITED STATES PATENTS

| Number | Name | Date |
|---|---|---|
| Re. 15,730 | Metzger | Dec. 11, 1923 |
| 1,259,500 | Evans | Mar. 19, 1918 |
| 1,396,895 | Stolz | Nov. 15, 1921 |
| 1,821,413 | Whitehouse | Sept. 1, 1931 |
| 1,844,486 | Tufts | Feb. 9, 1932 |
| 2,391,731 | Miller et al. | Dec. 25, 1945 |

FOREIGN PATENTS

| Number | Country | Date |
|---|---|---|
| 169,354 | Great Britain | Sept. 29, 1921 |

OTHER REFERENCES

Modern Plastics, "Fabricating Endless Belts," June 1950, pp. 89, 92 and 94.